July 19, 1960

R. S. SANFORD ET AL 2,945,566

FLUID PRESSURE BRAKE MECHANISM

Filed June 2, 1955

INVENTORS
Roy S. Sanford
James O. Eames

BY Wilfred G. Eaton,

AGENT

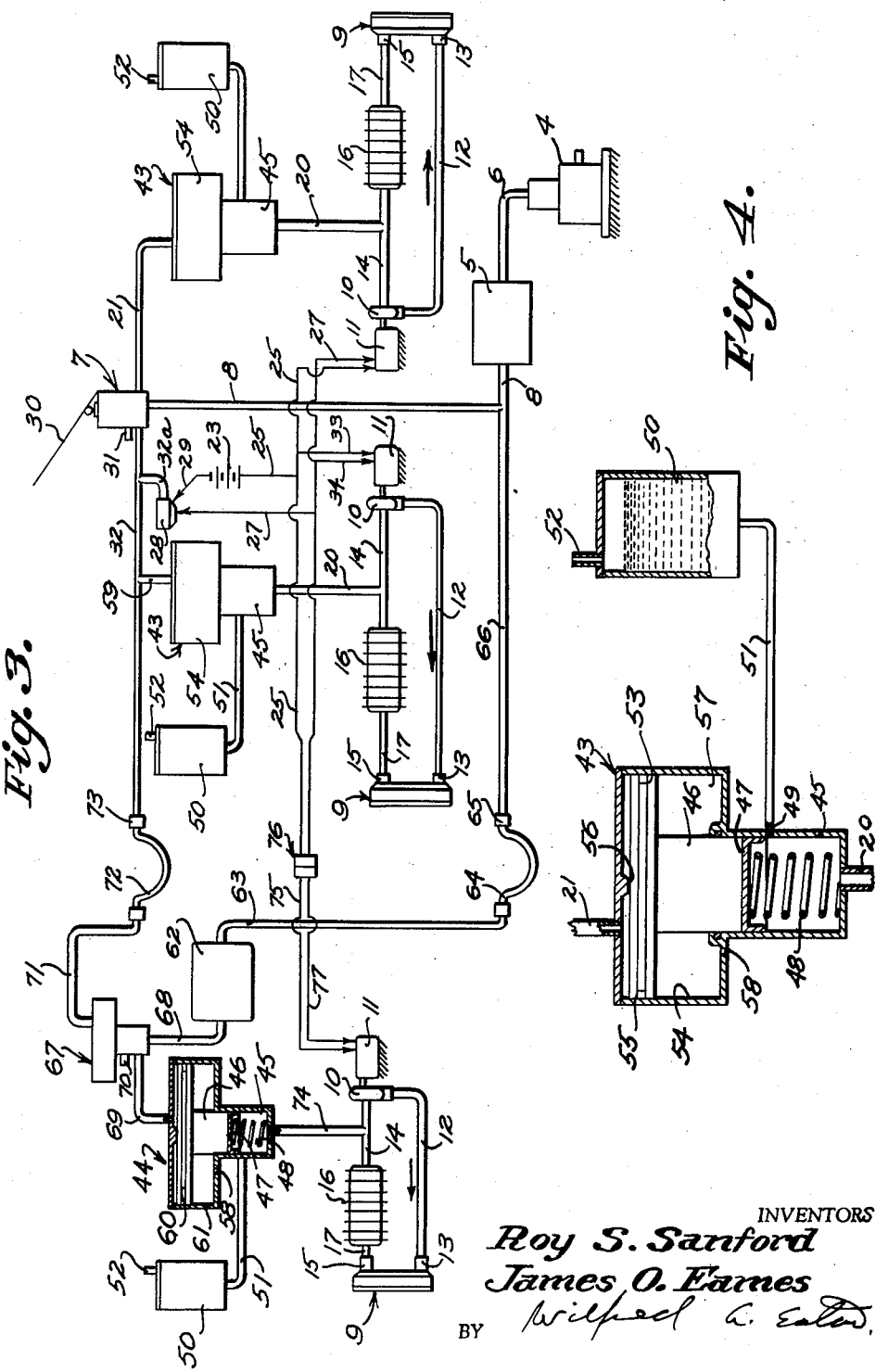

July 19, 1960    R. S. SANFORD ET AL    2,945,566
FLUID PRESSURE BRAKE MECHANISM
Filed June 2, 1955    4 Sheets-Sheet 3
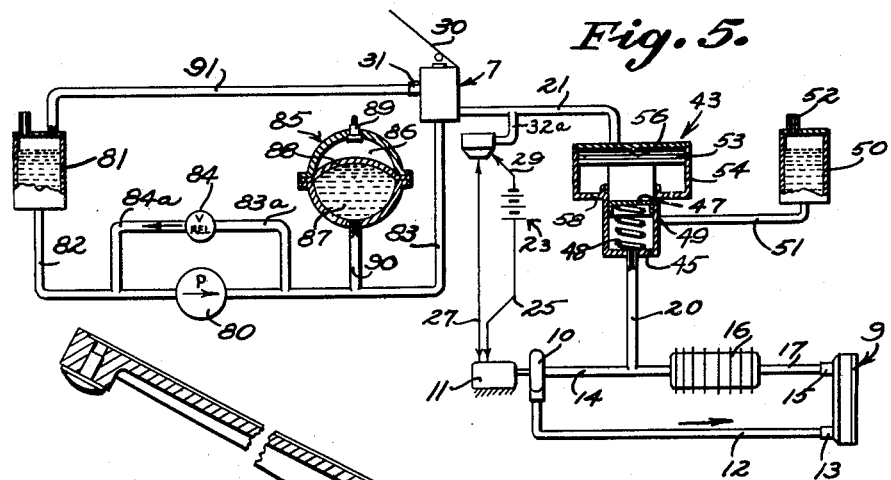
Fig. 5.
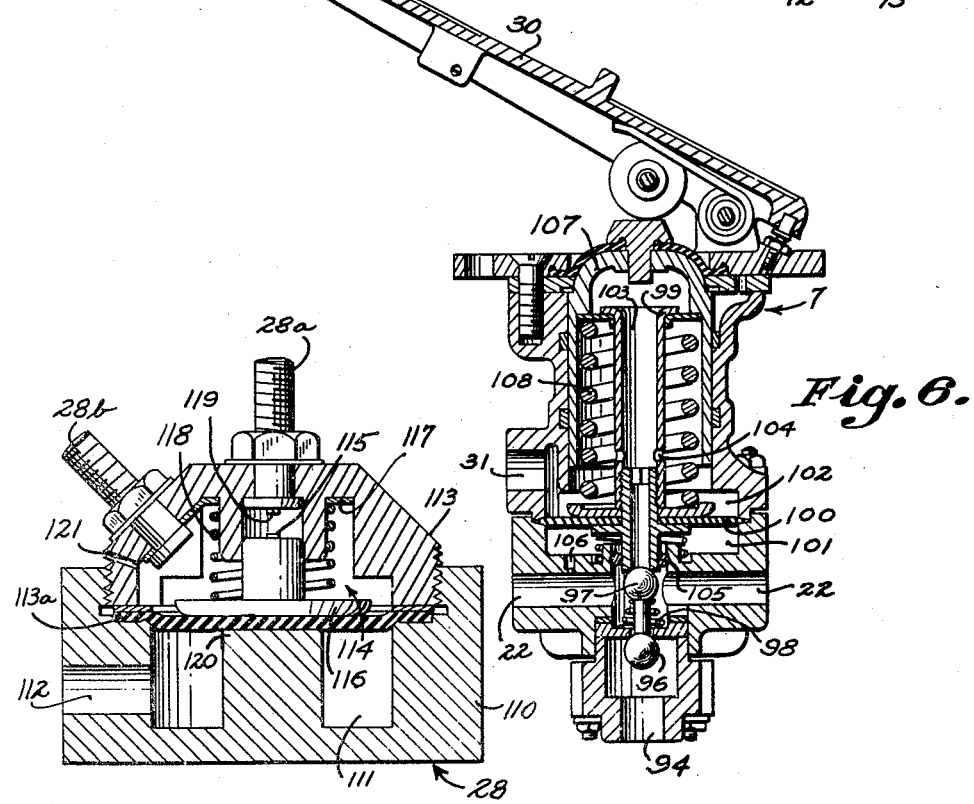
Fig. 6.
Fig. 7.
INVENTORS
Roy S. Sanford
James O. Eames
BY
AGENT INVENTORS
Roy S. Sanford
James O. Eames
BY Wilfred G. Estes
AGENT United States Patent Office 2,945,566
Patented July 19, 1960

2,945,566

FLUID PRESSURE BRAKE MECHANISM

Roy S. Sanford, Woodbury, and James O. Eames, Washington, Conn., assignors to Roy S. Sanford, Woodbury, Roger H. Casler and James O. Eames, Washington, and Wilfred A. Eaton and Erling D. Sedergren, Woodbury, Conn.

Filed June 2, 1955, Ser. No. 512,692

28 Claims. (Cl. 188—264)

This invention relates primarily to frictional mechanisms, and more particularly to liquid-cooled and fluid pressure operated brake mechanisms.

One of the objects of the invention is to provide liquid-cooled frictional mechanism and means for controlling the operation of the mechanism.

Another object of the invention is to provide liquid-cooled and fluid pressure operated frictional mechanism, so constituted as to be readily controlled from a remotely positioned control station.

Yet another object of the invention is the provision of frictional mechanism having power means for circulating a cooling liquid therethrough, together with means for effecting power operation of the brakes from a separate power source.

A still further object of the invention is to provide liquid-cooled frictional mechanism, and means for automatically controlling the circulation of cooling liquid through the mechanism.

Another object of the invention is the provision of means for effecting brake equalization on a plurality of remotely positioned liquid-cooled brake mechanisms under the control of a single control element.

Still another object of the invention is the provision of means for effecting differential pressure actuation of a plurality of remotely positioned liquid-cooled frictional mechanisms from a single control station.

These and other objects of the invention will be readily understood by those skilled in the art when considered in the light of the following specification and the accompanying drawings, wherein several embodiments of the invention are illustrated. It is to be specifically understood, however, that the drawings are utilized for purposes of illustration only, and are not to be considered as defining the limits of the invention, reference being had for this purpose to the appended claims.

In the drawings, wherein similar reference numerals refer to similar parts throughout the several views, Fig. 1 is a schematic view, partially in section, showing a brake system embodying one form of the invention;

Fig. 3 illustrates in schematic form still another brake system embodying the principles of the invention;

Fig. 4 is a sectional view of a portion of the system shown in Fig. 3;

Fig. 5 is a view, partially in section, of another form of brake system;

Fig. 6 is a sectional view of a control valve for the brake system;

Fig. 7 is a sectional view of a control switch adapted for use in connection with the present invention.

Figure 1:
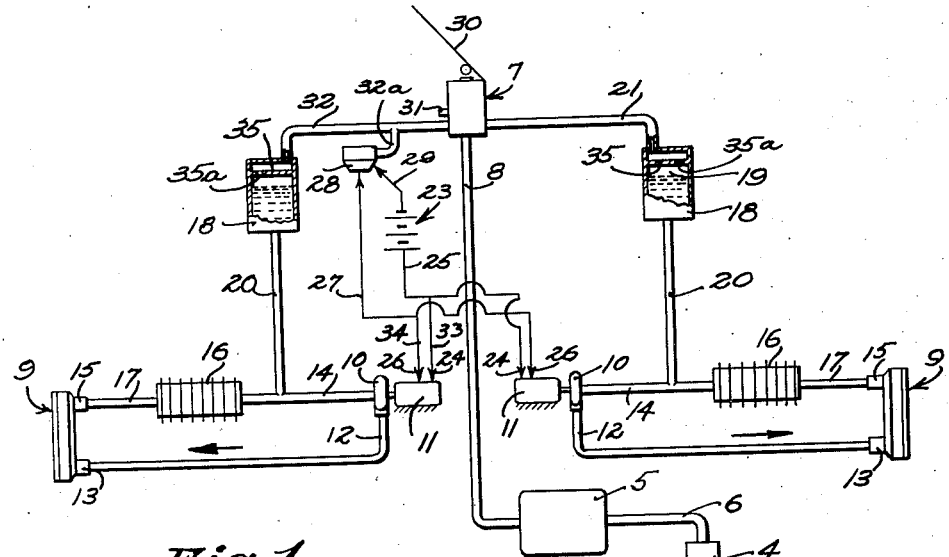

Referring more particularly to Fig. 1 of the drawings, the system illustrated includes in general an air compressor 4, driven by suitable means, not shown, a compressed air reservoir 5 connected to the compressor by a discharge line 6, a self-lapping brake valve 7 connected to the reservoir 5 by a supply line 8, and a liquid-cooled brake mechanism and brake actuator 9, to be described more fully hereinafter, the latter being connected to a suitable liquid circulating system and to a control system, as will be more fully described. The liquid circulating system includes a circulating pump 10, which may be of the centrifugal type and adapted to be driven by an electric motor 11, a pump outlet conduit 12 connected to an inlet conduit 13 of the actuator 9, and a pump inlet conduit 14 connected to an outlet conduit 15 of the brake actuator through a heat exchanger 16 and a conduit 17. A liquid reservoir 18 is provided with an upper portion 19 and its lower end is connected to the conduit 14 through a conduit 20. The upper end of the reservoir is connected by a conduit 21 with an outlet port 22 of the brake control valve, shown in Fig. 6. In the embodiment shown, a battery 23 is provided for operating the electric motor 11, one side of the battery being connected to terminal 24 of the motor by means of wire 25, and the terminal 26 being connected to the other side of the battery through wire 27, switch 28, and wire 29.

The brake control valve is provided with a control pedal 30, and as will be more fully described hereinafter. The construction of the control valve, which may be constructed as set forth in the patent to William L. Andres and Roy S. Sanford No. 2,133,275, dated October 18, 1938, is such that with the control pedal in release position, the inlet conduit 8 from the reservoir is disconnected from the outlet conduit 21 leading to the liquid reservoir 18, and the conduit 21 is connected to atmosphere through the valve mechanism and an exhaust port 31 on the valve. On depression of the pedal 30, the construction is such that the conduit 8 will be connected with the conduit 21, and the latter conduit will be disconnected from the exhaust port 31 of the valve. For any given position of the brake pedal, a predetermined pressure will be established and maintained in the conduit 21 and in the upper portion of the liquid reservoir 18. This pressure will act on the liquid in the reservoir and serve to pressurize the liquid in the brake actuator 9 as will be more fully described hereinafter. In the event the above described brake mechanism is applied to a vehicle having front and rear brakes, for example, the brake actuator 9, circulating pump 10, drive motor 11, heat exchanger 16, liquid reservoir 18, and conduits 12, 13, 14, 15, 17 and 20 are duplicated on the other end of the vehicle as shown, and a conduit 32 connects the other outlet port 22 of the brake valve with the liquid reservoir 18 shown at the left of the drawing to pressurize the liquid in that reservoir on application of the brake valve. A conduit 32a connects conduit 32 with the switch 28, and the latter is accordingly responsive to brake valve pressure. A wire 33 connects the left hand motor terminal 24 to the wire 25, and a wire 34 connects the other terminal 26 to the wire 27 and to the switch.

The operation of the right and left hand portions of the system is identical on operation of the brake valve, and accordingly the operation of the right hand portion of the system only will be described. Through suitable compressor control mechanism, not shown, the compressor 4, which may normally be driven by the vehicle engine, for example, is so constituted as to maintain a predetermined air pressure in the reservoir 5, this being communicated to the brake valve through conduit 8. On depression of the brake pedal 30, pressure is built up in the outlet conduit 32 of the brake valve and actuates the switch 28 to connect the battery 23 with the motor 11 to energize the latter and operate the circulating pump 10. The switch is arranged to operate at a very low pressure, and consequently the circulating pump motor will be energized immediately on initial depression of the brake pedal. Thus, cooling liquid is circulated through the brake actuator 9 before the brake is applied sufficiently to cause the generation of any appreciable amount of heat between the friction elements.

On further reference to the drawing, it will be noted that the system which includes the brake actuator, the heat exchanger, the pump, and the connecting conduits, comprises a substantially closed or endless circulating liquid system, and it will be evident that when the circulating pump is running, liquid will be circulated in a closed system or endless path from the pump to the actuator and back to the suction side of the pump through the heat exchanger. The reservoir 18, which contains a supply of cooling liquid, is connected to the suction line 14 of the above closed system, and serves to keep that system full of liquid in the event of slight leakage at the actuator or at the packing of the pump shaft. The circulating pump 10, however, plays no part in the actual brake application, merely serving to circulate the cooling liquid to prevent overheating of the brake. The brake is actually applied by pressurizing the liquid in the above described closed system from an outside liquid pumping means or source, this outside means or source in this case being the reservoir 5 and the compressed air in reservoir 5 supplied by the compressor 4. On operation of the brake pedal 30 to apply the brake, compressed air is supplied to the upper portion of the reservoir 18 from reservoir 5 through the control valve and the conduit 21, and this acts to force additional cooling liquid into the closed circulating system to operate the actuator 35 and to apply the brake. When it is desired to release the brake, the brake pedal is released, whereupon the conduit 21 is connected to atmosphere through exhaust port 31 of the control valve, and the reservoir 5 is disconnected from the conduit 21. At the same time, due to the fact that conduit 32 is connected to atmosphere through the control valve, the switch operates to disconnect the motor from the battery, and the circulating pump can stop, thus stopping the circulation of cooling liquid through the actuator. The same action occurs in the closed system shown at the left of Fig. 1, and assuming that the two actuators 9 are identical in size and construction, and that the conduit system forming each closed liquid circuit is the same, both brake actuators will be operated by substantially the same pressures, and the brakes will be equalized.

Although the switch 28 is shown as being of the pressure operated type operated by fluid pressure from the brake valve 7, it will be understood that the switch may, without departing from the spirit of the invention, be operated mechanically by the brake valve pedal 30 during initial movement thereof to apply the brake. In either case, it is desirable that the switch contacts be brought together to energize the circulating pump motor as soon as the brake pedal is depressed.

In view of the fact that this is a liquid cooled brake cooled by a circulating liquid, it is obvious that the liquid will heat up during a brake application, and that consequently the liquid will expand in the closed portion of the system and tend to back up into the reservoir 18. To this end, a small clearance volume is left in reservoir 18 above the liquid, and as the liquid expands, air is forced out from this clearance volume through the conduit 21, the control valve 7, and the exhaust port 31 of the valve, the construction of the self-lapping valve being such, however, that regardless of the amount of compressed air forced out through the brake valve by the expansion of the cooling liquid, the valve will maintain a substantially constant pressure in the clearance volume of the reservoir 18 for any given position of the brake pedal. In order to minimize the possibility of the cooling liquid being exhausted to atmosphere through conduit 21 and the brake valve from the reservoir 18, a suitable baffle 35 may be provided in the upper portion of the reservoir 18 as shown, the baffle having a port 35a therethrough.

Figure 8:
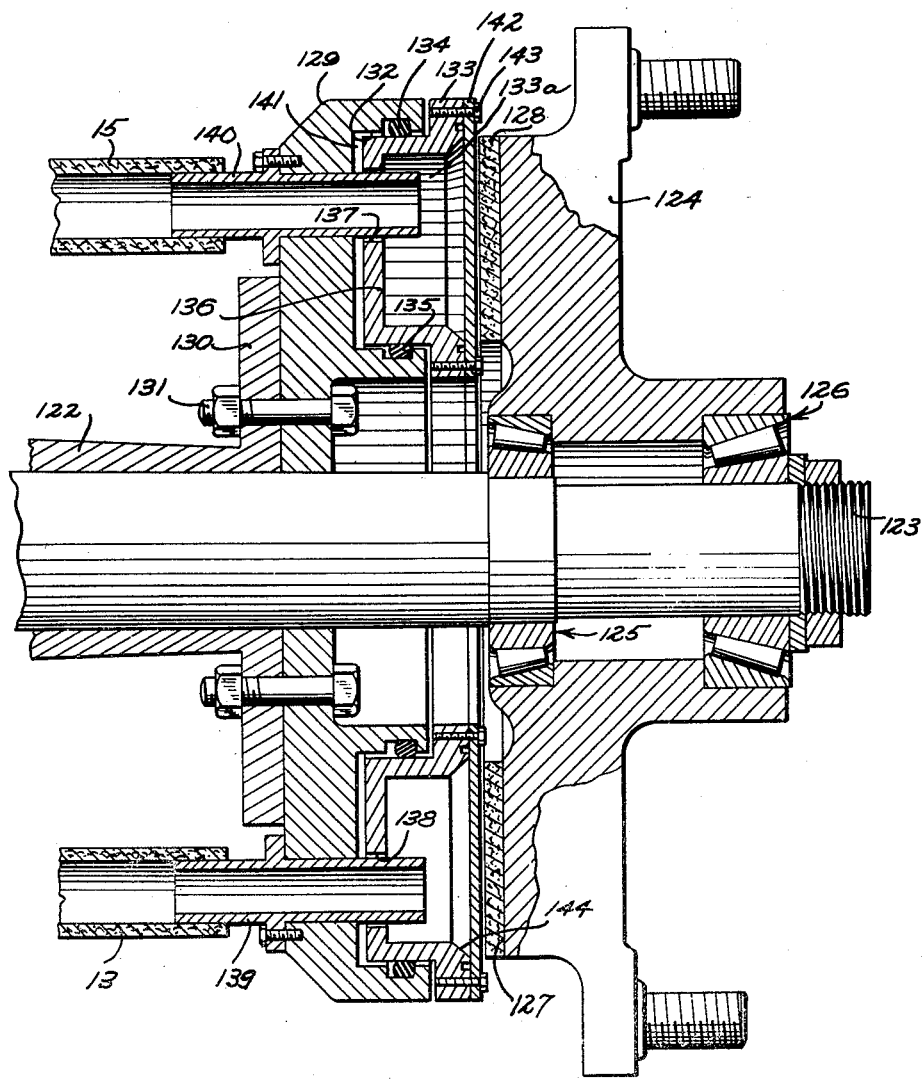
Fig. 8 is a sectional view of a liquid-cooled brake mechanism adapted for use in connection with the present invention.

From the foregoing, it will be apparent that although the cooling liquid in the above described closed system or endless circulating system portion of the brake mechanism is pressurized by the operation of the brake valve during a brake application, the power required to operate the pump is not increased due to this pressurization, the only pressure built up in the closed portion of the system due to the operation of the pump being that caused by the inherent restrictions in the conduits, brake actuator, and heat exchanger. Consequently a motor of relatively low power can be utilized for driving the pump, and the entire closed system, together with the liquid reservoir 18 and the driving motor 11, can be located directly adjacent the brake actuator 9 as a separate unit adapted to be readily controlled by the operation of the remotely positioned brake control valve 7. The circulating liquid, however, acts directly on the brake actuator piston, and in the event the actuator is constructed as shown in Fig. 8 the forces acting in opposite directions on the unsupported portion of the brake actuator friction element will be substantially balanced. Although a heat exchanger has been shown in the drawing, and will serve to dissipate the heat developed in the brake actuator between the relatively moving friction elements, it will be understood that in the event the radiating area of the conduits is sufficient to dissipate this heat, the separate heat exchanger may be dispensed with.

Figure 2:
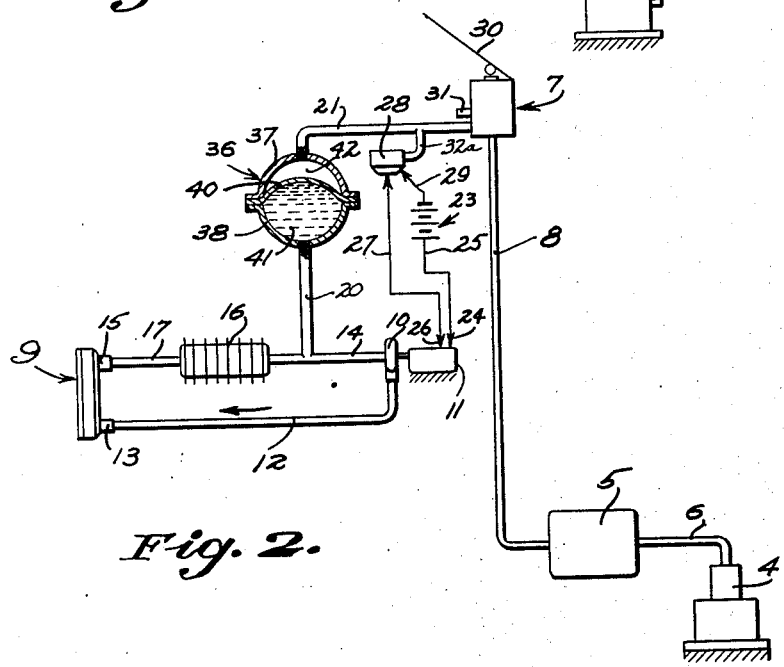
Fig. 2 is a schematic view, partially in section, of a brake system embodying another form of the invention.

Referring now to Fig. 2 of the drawings, a modified form of the invention is shown, wherein the liquid reservoir 18 is replaced by an accumulator type device 36. This device may be of spherical form as shown, having upper and lower portions 37 and 38 secured together and having a rubber-like diaphragm 40 secured between the two semi-spherical portions as shown, this diaphragm serving to divide the device 36 into a lower liquid chamber 41 and an upper compressed air chamber 42. The air chamber is connected to brake valve 7 by means of conduit 21, and the liquid chamber is connected to conduit 14 of the endless circulating system by conduit 20.

The endless circulating system again includes actuator 9, pump 10 driven by motor 11, heat exchanger 16, and the necessary connecting conduits as shown and described in connection with Fig. 1. The normally open switch 28 is connected to line 21 by conduit 32a as shown, and is responsive to the pressure therein, one side of the battery 23 being connected to the switch by wire 29 and the other side of the battery being connected to the motor by wire 25, the other terminal of the motor in turn being connected to the switch by wire 27. The brake valve 7 is connected to the compressed air reservoir 5 by conduit 8 in the same manner as shown in Fig. 1, and on operation of the brake pedal 30, compressed air is admitted to line 21 to operate the switch 28 to energize the motor 11, and is admitted to chamber 42 of the accumulator device to pressurize the liquid in the lower chamber below the diaphragm 40.

Thus it will be apparent from the foregoing description that the system shown in Fig. 2 operates substantially in the same manner as that shown and previously described in connection with Fig. 1, the exception being that the compressed air portion of the system is definitely separated from the circulating liquid portion of the system by means of the flexible diaphragm 40. On operation of the brake valve pedal 30, the chamber 42 of the accumulator device above the diaphragm 40, is pressurized, and the circulating liquid in the closed system is in turn pressurized by a corresponding amount in order to operate the piston of the actuator 9 and apply the brake. In the event liquid expansion occurs in the endless circulating system due to heating of the liquid by the application of the brake, this liquid expands into the lower chamber 41, the diaphragm 40 moves upward to compress the air in chamber 42, and any excess pressure developed in the chamber 42 is exhausted to atmosphere through the conduit 21, the brake valve 7 and the exhaust port 31 of the brake valve. Due to the characteristics of the self-lapping valve 7, the pressure of the air in the chamber 42, and consequently the pressure of the liquid in the endless circulating system which is effective to apply the brake, remains substantially constant for a given pedal position regardless of the degree of expansion of the cooling liquid due to heat. In the event of subsequent cooling of the circulating liquid as the vehicle remains stationary with the brake applied, the liquid will contract, and the self-lapping valve will then be operative to supply additional compressed air to the chamber 42 in order to maintain the pressure in that chamber and in the lower chamber 41 substantially constant. Thus the pressure supplied to the actuator is at all times substantially proportional to the movement of the brake pedal 30, and the brake may be readily controlled by the operator. Although only a single brake actuator has been shown in this view, it will be understood by those skilled in the art that any additional number of remotely positioned actuators and corresponding endless circulating systems and accumulator devices may be connected to and controlled by the brake valve in the same manner as shown in Fig. 1. It should also be noted that when the brake pedal is released, the circulating pump stops, and that consequently, any pressure which might otherwise be built up in the brake actuator 9 by the action of the pump due to the inherent restrictions in the system will be relieved, whereby the liquid in the brake actuator will be at substantially atmospheric pressure, and there will be no tendency for the brake to drag.

Fig. 3 is illustrative of a brake installation on a tractor and semi-trailer, wherein it may be desirable to apply a different braking force to the brakes on the semi-trailer than that which is applied on the tractor. In this embodiment of the invention, the tractor is provided with two endless or closed brake circulating systems, each including a brake actuator 9 of the type illustrated in detail in Fig. 8, a circulating pump 10 driven by an electric motor 11, a conduit 12 connecting the outlet of the pump with an inlet conduit 13 on the brake actuator, the suction of the pump being connected to the outlet conduit 15 of the actuator through a conduit 14, a heat exchanger 16, and conduit 17. Each of the circulating pumps 10 is driven by an electric motor 11 as illustrated. The semi-trailer is likewise provided with a closed circulating system which includes the same units, namely the brake actuator, the circulating pump, the drive motor for the circulating pump, the heat exchanger, and the corresponding connecting conduits. In the present instance, however, pressure from an outside source is imposed on each of the closed circulating systems by differential piston units 43 on the tractor and 44 on the semi-trailer, the units 43 and 44 differing only in dimension, as will be more fully described hereinafter.

Referring more particularly to the sectional view of the differential pressure unit 43, as shown in Fig. 4, this includes a cylinder 45 connected to conduit 14 by conduit 20, this cylinder having a piston 46 slidably mounted therein having a sealing cup 47 maintained against the lower end thereof by means of a spring 48 interposed between the cup and the lower end of the cylinder 45. The wall of the cylinder 45 is provided with a bleed port 49 connected to a liquid reservoir 50 by means of conduit 51, the upper end of the reservoir 50 being provided with an atmospheric port 52. The upper end of piston 46 is provided with an enlarged piston portion 53, this piston portion being slidably mounted in an enlarged cylinder 54 and provided with a suitable sealing ring 55. The upper end of the enlarged cylinder 54 is connected to brake valve 7 by means of conduit 21, and with the parts in the position shown the enlarged piston portion is maintained against a stop 56 on the head of the enlarged cylinder portion by means of the spring 48. The piston 46 and the enlarged piston portion 53 thus form, in connection with the large cylinder 54, an annular chamber 57, and in order to permit unrestricted movement of the piston downward in the cylinder, this chamber is provided with an atmospheric port 58. With the piston in the position shown, it will be noted that the bleed port 49 is uncovered, and that consequently the cylinder 45 is connected to the reservoir 50 and consequently to atmosphere via the conduit 51. It should also be noted that the cylinder 45 is preferably connected to a low pressure portion of the endless circulating system of the brake actuator 9, such as the conduit 14 which is connected to the suction of the pump 10.

Referring again to Fig. 3, the brake valve 7, as previously mentioned, is of the self-lapping type, adapted on movement of the control element 30 from the position shown to establish and maintain in the conduit 21 a pressure proportional to the degree of movement of the brake pedal 30 from the position shown, the brake valve being supplied with compressed air from a reservoir 5 through a conduit 8, and the reservoir in turn being supplied through conduit 6 with compressed air from a compressor 4 driven by suitable means, not shown.

Thus on depression of the brake pedal 30, the brake valve is operated to supply compressed air to the upper end of the enlarged cylinder 54, whereupon the enlarged piston 53 and the smaller piston 46 are simultaneously moved downward, the small piston first closing the port 49, and thereafter pressurizing or pumping additional liquid into the closed circulating system as previously described. Since the pistons have differential areas, the pressure imposed on the endless circulating system will be greater than that supplied to the upper end of the differential piston unit from the brake valve depending on the relative areas of the differential pistons in the unit 43. In the event thermal expansion of the liquid in the endless circulating system occurs due to the operation of the brake actuator 9, the differential piston in unit 43 will be moved upward due to this expansion, and compressed air will accordingly be exhausted to atmosphere through the conduit 21, the brake valve 7, and the exhaust port 31 of the brake valve, this occurring, as previously described, without any appreciable change in the pressure maintained on the upper side of the large piston in the unit 43. In the event an expansion of the liquid in the circulating system occurs sufficient to move the differential piston back to the position shown in the drawing, any excess expanded liquid will be discharged into the reservoir 50 through the bleed port 49 and conduit 51, and when the excess liquid is discharged, the differential piston will again be moved downward to close port 49 by the compressed air supplied to the upper end of the unit by the brake valve. Thus, any thermal expansion or contraction of the circulating liquid is automatically compensated for, and in the event of leakage from the closed circulating system, this leakage will automatically be replaced from the reservoir 50 through the conduit 51 and bleed port 49. The pressure supplied to the endless circulating system and the pressure supplied to the differential piston unit by the brake valve will at all times be proportional, the proportion of these pressures being dependent on the relative areas of the pistons 46 and 53. A brake valve outlet conduit 32 and conduit 59 serve to connect the brake valve with the upper chamber of the left-hand differential piston unit 43, this operating in the same manner as the unit already described. This unit also has a liquid supply reservoir 50 connected thereto through a conduit 51, and the operation is in all respects identical with that previously described in connection with the right-hand unit 43. The pressure in the closed circulating system of the brake and that supplied to the differential piston unit by the brake valve may be chosen to suit the conditions of operation merely by properly choosing the ratios of differential piston areas.

As was the case in connection with Figs. 1 and 2, the operation of the electric motors 11 which drive the pumps 10 is controlled by a switch 28 connected to outlet line 32 of the brake valve. A battery 23 is connected to one terminal of the switch by a wire 29 and a wire 27 connected to the other terminal of the switch is connected to one terminal of the two tractor motors, this wire being connected directly to the terminal of the right-hand motor, and being connected to the terminal of the left-hand motor on the tractor by means of a wire 34. The other terminals of the right and left-hand motors are connected with the other side of the battery 23 by wires 25 and 33. As shown in Fig. 7, to be more fully described hereinafter, the contacts of the switch 28 are normally open, and the operation is such that on initial operation of the brake valve to supply fluid under pressure to the conduit 32 and to the switch, the contacts are immediately closed, and the motors 11 are energized to operate the pumps 10 to circulate cooling liquid through the tractor brake actuators 9. On release of the brake pedal, the pressure is relieved from the conduits 32 and 32a and the switch contacts are accordingly opened, causing the motors to be deenergized. This arrangement insures a positive circulation of cooling liquid through the brake actuators whenever the brakes are applied, and prevents the possibility of over heating of the brake friction elements.

The semi-trailer portion of the system shown at the left of the drawing is substantially identical in operation with that already described, the only difference being in the dimensioning of the differential piston unit 44. This unit includes small cylinder 45 having small piston 46 slidably mounted therein and provided at its lower end with a sealing cup 47 maintained against the lower end of the piston by means of a spring 48 interposed between the piston cup and the lower end of the cylinder as shown. A normally open bleed port 49 is connected to a supply reservoir 50 by means of a conduit 51 as shown.

The upper end of the small piston 46, however, is provided with an enlarged piston 60 slidably mounted in an enlarged cylinder 61, the area of piston 60 being appreciably greater than the area of the piston portions 53 in the tractor unit 43. Thus, when fluid pressure is applied to the upper end of the enlarged piston, the small piston 46 moves downward to first close the bleed port 49, and to thereafter pump additional liquid into the endless circulating system to raise the pressure in the brake actuator 9, in the same manner as that previously described in connection with the brakes on the tractor. Since the piston 60 is larger than the corresponding pistons on the tractor differential piston units, however, the pressure in the brake actuator on the seim-trailer will be greater than that in the brake actuators on the tractor and a greater braking force will consequently be applied to the trailer brakes.

The semi-trailer is provided with a compressed air reservoir 62 connected to the compressed air reservoir 5 on the tractor through conduit 63, flexible hose connection 64 extending between the tractor and trailer, coupling 65 on the tractor, and conduits 66 and 8. In order to insure a rapid brake application on the trailer, a relay valve 67, of conventional construction, is provided on the tractor. This relay valve, which may be constructed as set forth in the patent to W. A. Eaton and Stephen Vorech, No. 2,018,202, dated October 22, 1935, is provided with an exhaust valve, inlet and exhaust ports, and a port adapted to be connected to the outlet port of the brake valve on the tractor. The construction is such that on operation of the brake valve, the relay valve is effective to connect the inlet and outlet ports and to close the exhaust port, the pressure supplied from the outlet port of the relay valve being substantially the same as that supplied to the relay valve from the brake valve. Thus, the valve is of the so-called self-lapping type, and establishes and maintains an outlet pressure at all times substantially equal to that supplied by the brake valve. The air pressure reservoir 62 is connected to the relay valve inlet port by a conduit 68, and the relay valve outlet port is connected to the upper end of the cylinder 61 by a conduit 69. The conduit 69, with the brake pedal 30 in release position on the tractor, is normally connected to atmosphere through the relay valve and relay valve exhaust port 70. As shown, the relay valve is connected to the outlet conduit 32 of the brake valve by means of a conduit 71, a flexible hose 72 extending between the tractor and trailer, and a hose coupling 73 on the rear end of the tractor.

Due to the foregoing, it will be apparent that on depression of the brake pedal 30 to operate the brake valve 7, a pressure substantially proportional to the degree of depression of the brake valve pedal will be applied to the upper ends of the enlarged pistons in the units 43 and 44, and this pressure will be maintained until the brake pedal is moved to a new position by the operator. When this pressure is applied to the pistons in the differential piston units, proportionally greater pressures will be imposed on the closed circulating systems on the tractor and trailer through the conduits shown, the small cylinder of the trailer unit 44 being connected to conduit 14 of the corresponding closed circulating system by means of a conduit 74.

Although the differentiatl piston units have been illustrated and are described herein as being actuated by either compressed air or by hydraulic fluid under pressure, it is to be understood that the units may be operated by vacuum from the intake manifold of the vehicle engine if desired by connecting the engine manifold to the annular chamber 57 of the differential piston unit through a self-lapping vacuum brake valve similar to the brake valve 7, and by connecting the conduit 21 above the enlarged portion of the differential piston to atmosphere.

In addition to the foregoing, the pump drive motor 11 on the trailer is energized at the same time and in the same manner as the pump motors on the tractor, it being noted that one terminal on the trailer motor is connected to wire 25 on the tractor by a wire 75 passing through a plug and socket unit 76 on the rear end of the tractor, while the other trailer motor terminal is connected to wire 27 by means of a wire 77 connected to the plug unit 76.

Although the differential piston units shown in Fig. 3 have been so arranged as to provide equal braking forces on the front and rear brakes of the tractor and a greater braking force on the trailer brakes, it will be understood that the degree of braking force applied to the brakes on each axle of the vehicle may be chosen in accordance with the conditions obtaining, and that if desired, the increased braking force may be applied to the front axle only of the vehicle or in any other desirable manner. It should also be pointed out that the system shown and described is particularly advantageous in connection with brake actuators which require a relatively high pressure for their application. Conventional air brake systems as used at the present time generally utilize pressures which do not appreciably exceed 80 pounds supplied to the brake actuator, while it may be desirable to use pressures of several hundred pounds in the actuators 9. This is readily accomplished by the proper proportioning of the areas of the differential pistons in the units 43 and 44. It should also be noted that in the event any leakage occurs from any of the three closed circulating systems shown, this leakage, through the action of the differential piston units, is automatically made up from the supply reservoirs 50. In addition to the foregoing, the arrangement is such that liquid expansion and contraction in the closed circulating systems due to heating or cooling of the liquid is automatically compensated for either during or after a brake application, while at the same time maintaining a degree of brake application in all the actuators which is directly proportional to the degree of movement of the brake pedal 30 by the operator. Although one brake actuator 9 and a corresponding closed circulating system and differential piston unit has been shown for each axle of the vehicle, it will be understood that each of these separate systems may operate both brakes on an axle if desired, one circulating pump being utilized to take care of the liquid circulation in both the right and left brakes on the axle. In any case, the system shown provides means for efficiently cooling the brakes, even though remotely situated from each other on the vehicle, and also provides for proper equalization of the various brakes in order to insure safe control of the vehicle during braking. Due to the fact that the liquid supply for the trailer brakes is self-contained on the trailer vehicle, no cooling liquid connections are required between the tractor and trailer, the only connections necessary being the flexible air hose connections already in common use on such vehicles, together with the wires necessary to connect the pump motor on the trailer with the battery and control switch on the tractor. Although the relay valve 67 has been shown in order to indicate a system more in accord with present day practice, it will be understood that the system will be operative in substantially the same manner in the event the relay valve is dispensed with and the conduit 71 is directly connected to the conduit 69. If the latter arrangement is used, the trailer brake application will lag behind that on the tractor, but the operation will otherwise be satisfactory. The use of a relay valve having its own air pressure supply carried by the trailer and fed from the supply on the tractor merely insures a much quicker brake application on the trailer than would otherwise be the case.

Referring now to Fig. 5 of the drawings, a system is shown which operates in substantially the same manner as that shown in Fig. 3, except that the power to operate the differential piston is supplied from a hydraulic power source rather than from a compressed air reservoir and compressor. Here again, the system, which is shown as applied to one brake actuator 9 includes a closed circulating system of the type shown in Fig. 3 comprising brake actuator 9, circulating pump 10 driven by electric motor 11, heat exchanger 16 connected to the suction of the pump by a conduit 14 and to the outlet conduit 15 of the brake actuator by a conduit 17, the outlet of the pump being connected to the inlet conduit 13 of the brake actuator by conduit 12. A differential piston unit 43 is provided, identical with that shown in Fig. 4, this unit including small cylinder 45 connected to conduit 14 by conduit 20, a piston cup 47 held against the lower end of the piston by spring 48 as shown, a bleed port 49 in the small cylinder wall connected to a vented liquid supply tank 50 by means of conduit 51, and an enlarged cylinder portion 54 having an enlarged piston 53 slidably mounted therein, the piston normally resting against stop 56 at the upper end of the large cylinder due to the action of the spring 48. The annular space between the small and large pistons is provided with a vent port 58 for purposes already described. In addition to the foregoing, the system includes a brake valve 7, which may be similar to that illustrated in Fig. 6, this brake valve, however, being connected in a power operated hydraulic system, rather than in a compressed air system.

The hydraulic system in the simple form illustrated may include a hydraulic pump 80 driven by the vehicle engine or by other suitable power means not shown, the inlet side of the pump being connected to a vented hydraulic liquid supply reservoir 81 by a conduit 82, and connected to the inlet port of brake valve 7 by means of a conduit 83. The pump, in the embodiment shown, may be arranged to run continuously when the vehicle engine or other power source is running, and when the pressure in the outlet conduit 83 exceeds a predetermined value, the liquid from the pump is bypassed back to the inlet conduit 82 through a conduit 83a, a relief valve 84 which may be set to maintain any desired pressure in the conduit 83, and a conduit 84a. In order to provide a reserve of power, a hydraulic accumulator 85 is provided, which may be of conventional construction, the accumulator having a compressed air chamber 86 and a hydraulic liquid chamber 87 separated by a flexible diaphragm 88. The air chamber may be supplied with a tire valve 89 for the purpose of pressurizing the air chamber 86 from an outside source of air pressure if desired. The liquid chamber 87 is connected to the conduit 83 by means of a conduit 90, and the operation is such that the liquid in the chamber 87 is normally maintained at a pressure determined by the setting of the relief valve 84. In the event the brake valve 7 is operated to supply liquid under pressure to the differential piston unit 43, as will be more fully described hereinafter, the air pressure in chamber 86, acting on the flexible diaphragm 88, acts to force liquid from the chamber 87 into the conduit 83, and as the pressure drops in the liquid chamber 87, the relief valve 84 closes, and the full output of the pump is available to supply hydraulic liquid to the brake valve and to return liquid to the accumulator to restore the original pressure in the chamber 87. The outlet port of the brake valve is connected to the upper end of the differential piston unit 43 by means of conduit 21, and in this embodiment of the invention, the exhaust port of the brake valve is connected to the upper end of the hydraulic supply reservoir 81 by means of a conduit 91.

As will be more fully explained hereinafter in connection with the detailed description of the brake valve shown in Fig. 6, the construction is such that with the brake pedal 30 in release position, the conduit 21 is connected with conduit 91 through the brake valve, and there is no connection between the inlet conduit 83 and either of the conduits 21 and 91. Consequently, on depression of the brake pedal, conduits 83 and 91 are disconnected, and conduits 83 and 21 are connected to supply hydraulic fluid under pressure from the accumulator and the pump to the upper end of the large piston in unit 43, at a pressure determined by the degree of movement of the brake pedal. On subsequent release of the brake pedal to its original position, conduits 83 and 21 are disconnected, and conduits 21 and 91 are connected through the brake valve, with the result that the hydraulic liquid supplied to the unit 43 by the brake valve on depression of the pedal is then exhausted to the hydraulic liquid reservoir 81 through the brake valve and can again be pumped into the accumulator by the pump 80.

As was the case in the embodiments previously described, a switch 28 is provided, the switch being connected with the outlet conduit 21 of the brake valve by conduit 32a. One switch terminal is connected to one of the motor terminals by a wire 27, and the other terminal is connected to one side of battery 23 by wire 29. The other side of the battery is connected to the other motor terminal by wire 25. The construction of the switch is such that the contacts close when a very low pressure is applied to the switch through conduits 21 and 32a and consequently, on initial depression of the brake pedal, the motor 11 is energized to start the circulating pump 10, and liquid is accordingly circulated through the closed circulating portion of the brake system in the manner previously described. At the same time, the differential piston unit 43 is effective to pump liquid into the closed portion of the system through the conduit 20 to raise the pressure of the liquid in that system and to operate the brake actuator 9 to effect a brake application. Since the control valve 7 is preferably of the self-lapping type, as previously described, it will be apparent that although the system described and shown in connection with the Fig. 5 is operated from a hydraulic power source, the principle of operation is identical with that already described in connection with the compressed air operation of the brake system. In the event of thermal expansion of the liquid in the closed circulating portion of the brake system during a brake application, the differential piston will be forced upward, the pressure in the conduit 21 will be increased, and due to the self-lapping nature of the control valve 7, liquid will be discharged into the reservoir 81 through the brake valve and the conduit 91 until sufficient liquid has been discharged to compensate for the increase in volume of the liquid in the closed portion of the system due to expansion, but due again to the self-lapping nature of the brake valve, the pressure of the liquid in the actuator and in the closed system will not change appreciably during this operation. All of these self-lapping valves have what is known as a lap range, but in most cases this is of the order of two or three pounds, and represents the variation which may occur in the outlet lines of the brake valve when the brake pedal is maintained at a given applied position. Although the system has been shown as applied to one brake actuator, it will be understood that the same system can be applied to the operation of a plurality of actuators in the manner shown in Fig. 3.

As indicated heretofore, it will be understood that due to the nature of the brake system disclosed, the liquid circulating through the brake actuator during a brake application will be heated and expand, and that following the brake application, the liquid will again become cooler and contract. Normally this will cause no difficulty during a brake application, as provision has been made for expansion of the cooling liquid in the brake actuator as heretofore described, the capaicty of the liquid reservoir 18 in Fig. 1 and the accumulator in Fig. 2 being sufficient to permit such expansion, and the construction of the brake valve 7 being such as to permit such expansion without any material change in the pressure applied to the brake actuator for a given position of the brake valve pedal. It is conceivable, however, that a severe brake application may be made, resulting in expansion and loss of the cooling liquid through the bleed port of the differential piston unit, and that the brake may be thereafter held in applied position while the liquid in the actuator cools down to atmospheric temperature. In this event the piston of the differential piston unit as shown in Fig. 4, for example, will have to move downward to compensate for this contraction of the liquid, and consequently the differential piston unit must be designed with sufficient piston stroke to take care of any such contingency. In like manner, the reservoir 18 of Fig. 1 and the accumulator 36 of Fig. 2 are so dimensioned and constituted as to have sufficient reserve liquid capacity under the above conditions. Consequently, the capacity of the above referred to units is so arranged as to take care of not only the liquid displacement necessary for a normal brake application, but is also arranged to take care of any thermal expansion of the liquid which may occur during a brake application, which thermal expansion would require additional capacity in the above units in the event of a subsequent and corresponding contraction of the liquid during cooling.

Referring now more specifically to Fig. 6, showing the construction of the brake valve 7, as fully disclosed in the above referred to Patent No. 2,133,275, the brake valve is provided with an inlet port 94, outlet ports 22 and exhaust port 31. Interconnected inlet and exhaust valves 96 and 97 control the flow of air in the valve, the inlet valve normally being maintained in closed position by a spring 98. A plunger 99 is provided having a flexible diaphragm 100 secured thereto as shown and clamped at its outer edge to the housing of the brake valve, thus forming a pressure chamber 101 below the diaphragm and another chamber 102 above the diaphragm. The plunger 99 is provided with a bore 103 extending through the center thereof and exhaust ports 104 in the wall of the bore which serves to connect the bore with the exhaust port 31 through the valve housing as shown. The lower end of the plunger 99 is slidably mounted in a seal ring 105, and the outlet ports 22 are connected with the pressure chamber 101 through a restricted passage 106, the chamber 101, and consequently the diaphragm 100, being thus subjected to the pressure of fluid in the outlet ports of the brake valve. The brake pedal 30 operates a plunger 107 slidably mounted in the brake valve casing, and this plunger is connected to the upper side of the diaphragm, or rather to the plunger 99, by means of a graduating spring 108. Although the exhaust valve in the drawing is shown as closed, the valve is held in closed position by a very slight force, and any appreciable pressure in the chamber 101 is sufficient to move the diaphragm and plunger upward to move the lower end of the plunger away from the surface of the exhaust valve 97 and to permit communication between outlet port 22 and exhaust port 31 to exhaust fluid from the outlet port. On depression of the brake pedal, the graduating spring moves the diaphragm and plunger down to insure closing of the exhaust valve and to open the inlet valve 96 to admit fluid from the reservoir to the outlet port through the inlet port 94 and the inlet valve 96. As the pressure builds up in the outlet port 22 and in the pressure chamber 101 through the port 106, the upward force exerted by the diaphragm increases, the graduating spring is compressed against the plunger 107 held in place by the foot pedal, and the plunger moves upward sufficiently to eventually close the inlet valve 96 and prevent the admission of any further fluid from the inlet port to the outlet port. When this condition occurs, the valve is said to be "lapped," and both the inlet and exhaust valves are held in closed position. The pressure in the outlet port 22 is directly proportional to the degree of movement of the brake pedal 30 from the position shown. In the event the pressure in the differential piston unit connected to the outlet port 22 increases for any reason, this increase in pressure is reflected in the pressure chamber 101 of the control valve, and the diaphragm moves upward against the force of the graduating spring sufficiently to slightly open the exhaust valve. Fluid is then exhaused from the valve through the exhaust port 31 until the pressures in the outlet port and in the pressure chamber 101 again balance sufficiently to permit downward movement of the diaphragm and plunger to again close the exhaust valve. On complete release of the brake pedal from applied position, the pressure in chamber 101 immediately forces the diaphragm and plunger upward sufficiently to open the exhaust valve wide, and fluid is exhausted from the outlet port 22, and the apparatus connected thereto until the outlet port reaches substantially atmospheric pressure.

Referring now to Fig. 7, the switch 28 includes a body portion 110 of molded plastic or other suitable insulating material provided with a fluid pressure chamber 111 and an inlet port 112 in the wall of the chamber as shown. A cover 113 of similar insulating material is screwed into the body portion 111, and a flexible diaphragm 113a of rubber-like material is clamped at its periphery between the body and the cover. A movable metallic switch element 114 rests on the upper side of the diaphragm as shown, this element being provided with a contact 115 at the upper end, and with an enlarged portion 116 at the lower end resting against the upper surface of the diaphragm. The upper end of the cover is provided with a metal element 117 having its left end connected to the terminal 28b. A spring 118 is interposed between the enlarged portion 116 of the contact element and the right hand portion of the metal element 117 and serves to provide an electrical connection between the metal element and the contact element 114. The center terminal 28a is attached to the cover as shown, and is provided at its lower end inside the cover with an electrical contact 119. As shown, the spring 118 normally pushes the contact member and the diaphragm downward so that the latter rests against a stop portion 120 in the body member, the contacts 115 and 119 being separated as shown. On the application of fluid under pressure to the chamber 111 through the inlet port 112, the diaphragm is moved upward to compress the spring, and the contacts 115 and 119 are brought together to complete the electrical circuit between the terminals 28a and 28b, this circuit including the contact member 114, the spring 118, and the metal connecting element 117. In order to prevent the possibility of a pressure build-up between the diaphragm and the cover in the event of fluid pressure leakage past the diaphragm, a vent port 121 may be provided in the cover as shown. Thus the switch, when connected as described in connection with Figs. 1 to 3 and 5, is effective on application of fluid pressure by the brake valve to energize the motor which drives the circulating pump in order to circulate cooling liquid through the brake actuator.

A brake actuator suitable for use in connection with the present invention may be constructed as shown in Fig. 8, and is of the type wherein the liquid circulated through the brake for cooling is also utilized to apply the brake, the cooling liquid being pressurized as previously described for this purpose. The brake in general includes an axle housing 122 and an axle 123, a vehicle wheel 124 being rotatably mounted on the axle by means of suitable roller bearings 125 and 126. The left-hand side of the wheel is provided with a flat annular face portion 127 having a brake friction ring of heat insulating composition material 128 secured thereto adhesively or otherwise, this ring being of annular shape. A brake cylinder 129 is secured to flange 130 on the axle housing by bolts 131 as shown. The cylinder is provided with an annular channel 132, and a piston member 133 is slidably mounted therein having an annular channel 133a. Suitable annular sealing rings 134 and 135 are provided in the cylinder wall to prevent leakage past the piston. The left end of the piston is provided with a wall 136 having spaced equalizing ports 137 and 138 therein, cooling liquid being admitted to the annular channel 133a of the piston through an inlet pipe 139 secured to the wall of the cylinder and extending through the port 138 into the piston, and being discharged from the interior of the piston on the upper side thereof through a similar outlet pipe 140 which is likewise secured to the wall of the cylinder and extends into the annular portion of the piston through the upper piston port 137, both of the ports 137 and 138 being larger than the outside diameter of the corresponding inlet and outlet pipes in order to permit the pressure of liquid in the piston to be transmitted to a chamber 141 formed between the bottom wall of the cylinder and the back wall of the piston. Rotation of the piston in the cylinder may be prevented by the pipes 139 and 140.

Since it is desirable to directly cool the brake in this case, a metal friction element 142, preferably of copper and of annular shape, is secured to the right face of the piston as shown by means of suitable screws 143, suitable gasket means being utilized to insure sealing engagement between the left face of the friction plate and right end of the piston. The right end of the piston channel is enlarged slightly as shown, as by means of a chamfer 144, so that the annular opening at the right end of the piston is of substantially the same area as that of the annular friction ring 128, and is substantially in line therewith. Thus the construction is such that with the annular channel portion 133a of the piston filled with liquid and the chamber 141 filled with the liquid, pressurizing of this liquid will serve to increase the pressure in the chamber 141 and force the piston to the right to effect frictional engagement between the metal friction plate 142 and the composition friction ring 128.

Referring now again to Fig. 1, it will be readily apparent that in the event the actuator 9 is of the construction described in connection with Fig. 8 the operation of the circulating pump 10 by the electric motor 11 will serve to circulate cooling fluid through the brake actuator, the fluid entering the piston channel through the inlet conduit 13, circulating through that channel to the top of the piston, and being discharged through the outlet conduit 15 and returned to the suction side of the pump through the heat exchanger 16 and the conduit 14. At the same time, the chamber 141 behind the piston is filled with liquid due to the connection furnished by the spaced ports 137 and 138, these ports also serving as pressure equalizing ports to insure that substantially the same pressure will obtain in the chamber 141 behind the piston as that which obtains in the annular piston channel. In view of the arrangement of the inlet pipes 137 and 138, however, most of the cooling liquid circulation will occur in the piston, and there will be very little circulation in the chamber 141 where cooling is not required. If the brake valve 7 is now operated to increase the pressure in the upper portion 19 of the liquid reservoir 18, the liquid 20 in that reservoir will be pressurized, and additional liquid will be forced into the closed circulating system through the conduit 20. This pressure will therefore be applied to the liquid circulating through the brakes, and this pressure will be effective to move the piston 132 to the right to effect engagement between the metal friction plate 142 and the composition friction ring 128 to apply the brake. As the liquid heats up and expands within the brake actuator due to the absorption of braking heat thereby, this heated liquid will be free to expand into the reservoir 18 through the conduit 20, and in the event this expansion is sufficient to appreciably raise the pressure of the compressed air in the chamber 19 above the liquid, the excess air pressure will be forced out to atmosphere through the exhaust port 31 of the brake valve as has been previously described, the brake valve, however, serving to maintain a pressure in the portion 19 of the reservoir which is substantially proportional at all times to the degree of movement of the brake pedal 30 from the released position to effect a brake application.

As soon as the brake pedal 30 is depressed to effect a brake application, the switch 28, which is so designed as to bring the electrical contacts 115 and 119 together as soon as a slight increase in pressure occurs in the conduits 32 and 32a, will be effective to complete the circuit between the battery 23 and the motors 11, thus starting the circulating pumps and causing cooling liquid to immediately circulate through the brake actuators prior to the development of any appreciable heat by the brake due to the frictional engagement of the metal friction plate 142 and the composition brake friction ring 128. This circulation will continue as long as there is presure in the conduit 32, and on release of the air pressure from the liquid reservoirs 18 to release the brakes, the brakes will cease to develop heat, and the electric motors driving the pumps will be deenergized at about the same time that the complete brake release is effected, the continuing circulation of the cooling liquid during the last portion of the brake release operation being sufficient to properly cool the brakes following the brake application.

It will be apparent from the foregoing description that simple and novel brake cooling and actuating mechanism has been provided so constituted as to be adapted to pressurization from an outside source as by means of compressed air or vacuum systems or by hydraulic brake systems, and also so constituted as to permit proper cooling and equalization simultaneously of a number of remotely positioned brake actuators. The invention also provides means for permitting proportional but different braking pressures to be applied to different and remotely positioned actuators at the same time in order to properly proportion the brakes on various wheels or axles of a vehicle. Since the work done by the circulating pumps 10 is substantially the same regardless of the degree of brake application, being a function primarily of the inherent restrictions in the system rather than of the pressure of the liquid in the endless circulating portion of the system, pumps of the centrifugal type may be used if desired, thus serving to eliminate many of the difficulties which might be encountered with positive displacement pumps in the event the cooling liquid used is water, it being difficult in some cases to secure proper lubrication in connection with pumps of the latter type when used with water or other coolants.

It should also be noted that all of the systems shown provide means for compensating for expansion of the liquid in the endless circulating system due to heat, and means for maintaining the pressure in the brake actuators in accordance with the setting of the brake control valve, regardless of the degree of such thermal expansion. The differential piston units 43 and 44 and the liquid reservoirs connected thereto provide simple and efficient means for adding additional cooling liquid to the system in the event of loss of the liquid therefrom due to leakage, and also provide means for automatically bleeding air out of the system. In this latter connection, it should be noted that although the units 43 and 44 are shown in the drawings in a vertical position, it is contemplated that they may be positioned horizontally with the bleed ports 49 uppermost in order to insure that all of the air which may reach the small cylinder 45 from the system bleeds back into the liquid supply reservoir 50. With such an arrangement, the conduit 51 connecting the bleed hole 49 and the reservoir 50 would be so arranged as to extend upward vertically from the bleed port to the liquid reservoir 50. Such an arrangement would also prevent the possibility of trapping air in the cylinder 45 within the packing cup 47, as might otherwise occur in the event the differential piston units were arranged as shown in the drawings. The system using the differential piston unit is particularly adapted for remote control, as on the axle of an automotive trailer, on a truck of a railway car, or on a wheel of an airplane landing gear. The use of a circulating pump which operates at a low head measured only by the inherent restriction in the circulating portion of the system allows the use of an electric motor of very low power to drive the pump, thus permitting such a motor to be operated, for example, from the battery of an ordinary truck or tractor. If desired, the pump may be operated directly from the vehicle wheel, or even from the vehicle engine, without departing from the spirit of the invention.

Although the invention has been illustrated and described in several embodiments with considerable particularity, it should be understood by those skilled in the art that other forms may be utilized without departing from the spirit of the invention. Reference will be had, therefore, to the appended claims for a definition of the limits of the invention.

What is claimed is:

1. Liquid cooled and fluid pressure operated frictional mechanism including an endless liquid circuit having a liquid pressure operated actuator connected in series therein having a movable friction member having a friction surface on one side and a surface on the other side thereof directly exposed to liquid in said actuator and means associated therewith responsive to the pressure of the liquid in the actuator for moving said member, a circulator connected in series in said circuit operable for forcibly circulating liquid in said endless liquid circuit to cool said friction member, a separate source of cooling liquid having a connection with said endless circuit at a low pressure region in the circuit, and means for pumping additional liquid from said source into said circuit to increase the pressure therein and actuate said pressure responsive means to move said friction member.

2. Liquid cooled and fluid pressure operated frictional mechanism as set forth in claim 1, wherein means are provided for driving said circulator, and means are provided responsive to the operation of said pumping means to actuate said pressure responsive means, for energizing said driving means to render the circulator operative to circulate liquid in said circuit.

3. Liquid cooled and fluid pressure operated frictional mechanism as set forth in claim 1, wherein said endless liquid circuit is provided with a normally open atmospheric vent port, and said pumping means includes a movable port closing member and is operable to sequentially close said port and pump liquid into said circuit.

4. Liquid cooled and fluid pressure operated frictional mechanism as set forth in claim 1, wherein said pumping means is power operated, pressure control mechanism is associated with said pumping means having a control element movable to different control positions, said pressure control mechanism being so constituted as to maintain different liquid pressures in said circuit corresponding to said different control element positions and to maintain said different pressures substantially constant regardless of thermal expansion or contraction of the liquid in said circuit.

5. Liquid cooled and fluid pressure operated frictional mechanism including a fluid pressure actuator having a movable friction element, inlet and outlet ports for respectively supplying cooling liquid to the actuator to engage and cool said element and discharging cooling liquid from the actuator, and means responsive to the pressure of liquid in the actuator for moving said element, a liquid circulating pump having connections with said inlet and outlet ports, said actuator, pump, and connections forming an endless circulating system and said friction element being directly exposed to liquid circulating in said actuator, and means for pressurizing the liquid in said system and actuator to move said element including a source of fluid under pressure, and connecting means between said source and system operable on application of fluid under pressure to said connecting means from said source to increase the pressure of the liquid in said system, said connecting means including liquid pumping means having a connection with the system and means responsive to the application of fluid pressure to said connecting means for operating said pumping means.

6. Liquid cooled and fluid pressure operated frictional mechanism as set forth in claim 5, wherein control valve means is associated with said connecting means for controlling the application of fluid under pressure to the pressure responsive means from said source.

7. Liquid cooled and fluid pressure operated frictional mechanism as set forth in claim 5, wherein said fluid is a compressed gas, and a fluid pressure control valve is associated with said connecting means for controlling the pressure of fluid applied to the pressure responsive means from said source, said control valve being of the self-lapping type and provided with a movable control element, and said valve having a member responsive to the operation of said control element and responsive to the pressure of fluid supplied to said connecting means for controlling the pressure of fluid applied to said connecting means at a value proportional to the degree of movement of said control element.

8. Liquid cooled and fluid pressure operated frictional mechanism as set forth in claim 5, wherein said fluid is a compressed gas, and a control valve and a liquid reservoir are associated with the connecting means between said source and system, said liquid reservoir having a connection with said system and a connection with said control valve, and said control valve having a connection with said source and being operable to control the pressure of fluid supplied to said reservoir from said source.

9. Liquid cooled and fluid pressure operated frictional mechanism as set forth in claim 5, wherein the means for pressurizing the liquid in said system and actuator includes a liquid chamber associated with said connecting means between the source and system and connected to the system, a fluid chamber adjacent said liquid chamber, a flexible diaphragm separating said liquid and fluid chambers, said fluid chamber having a connection with said source, and said last named connection having a control valve associated therewith for controlling the pressure of fluid supplied to said fluid chamber from said source.

10. Liquid cooled and fluid pressure operated frictional mechanism as set forth in claim 5, wherein a control valve is associated with said connecting means between the source and system for controlling the pressure of fluid supplied from the source to the connecting means, a motor is provided for operating said circulating pump, and means are provided for energizing said motor, said motor energizing means being responsive to the pressure of fluid supplied to the connecting means by the control valve.

11. Liquid cooled and fluid pressure operated frictional mechanism as set forth in claim 5, wherein a control valve is associated with the connecting means between said source and system for controlling the pressure of fluid supplied to said connecting means from said source, an electric motor is provided for operating said circulating pump, and a pressure responsive switch is provided having a connection with said control valve, said switch being responsive to the application of pressure to said connecting means by the operation of said control valve for energizing said circulating pump motor.

12. Liquid cooled and fluid pressure operated frictional mechanism including a fluid pressure actuator having a movable friction element, means associated with said element and responsive to the pressure of liquid supplied to said actuator for moving said element, inlet and outlet ports in the actuator for respectively supplying cooling liquid to the actuator to engage and cool said element and discharging cooling liquid from the actuator, a liquid circulating pump having connections with said inlet and outlet ports, said actuator, pump, and connections forming an endless liquid circulating system and said friction element being directly exposed to liquid circulating in said actuator, a separate reservoir for cooling liquid having a connection with said endless circulating system and adapted to supply additional liquid thereto through said connection, and separate pump means associated with said liquid reservoir and operable to pressurize the liquid in said reservoir and endless circulating system.

13. Liquid cooled and fluid pressure operated frictional mechanism including a pair of remotely positioned fluid pressure actuators each having a movable friction element, means associated therewith and responsive to the pressure of liquid in the actuator for moving said element, and inlet and outlet ports for supplying cooling liquid to the actuator and for discharging liquid therefrom, a liquid circulating pump positioned adjacent each actuator having connections with said inlet and outlet ports, each actuator, pump, and the connections therebetween forming a separate endless liquid circulating system, separate drive means for each pump, means including two pumping means separate from said liquid circulating pumps and each operatively connected with one of said endless systems for pumping additional liquid into said systems to increase the pressure of the liquid therein and to move said friction elements, and common control means for controlling the operation of said separate pumping means.

14. Liquid cooled and fluid pressure operated frictional mechanism including a pair of remotely positioned fluid pressure actuators each having a movable friction element, means associated therewith and responsive to the pressure of liquid in the actuator for moving said element, and inlet and outlet ports for supplying cooling liquid to the actuator and for discharging liquid therefrom, a liquid circulating pump positioned adjacent each actuator having connections with said inlet and outlet ports, each actuator, pump, and the connections therebetween forming a separate endless liquid circulating system, a liquid reservoir adjacent each of said endless circulating systems having a normally open connection therewith, separate drive means for each circulating pump, fluid pressure operated liquid pumping means associated with each of said endless circulating systems having a connection therewith and a movable pumping member responsive to the application of fluid pressure thereto to pump additional liquid into said endless circulating system and increase the pressure of liquid therein, means operable on initial movement of said pumping member to close said normally open connection between said endless circulating system and said liquid reservoir, a separate source of fluid pressure having connections with each of said fluid pressure operated pumping means, and control valve means for controlling the pressure of fluid supplied from said source to said fluid pressure operated pumping means.

15. Liquid cooled and fluid pressure operated frictional mechanism as set forth in claim 14, wherein said control valve means is a self-lapping control valve having a control element, said valve being provided with inlet and exhaust valves, and being operable with said control element in one position to exhaust each of said fluid pressure operated pumping means to atmosphere and operable with said control element in other positions to establish and maintain the pressure of fluid supplied to said pumping means at a value proportional to the degree of movement of said control element from said one position.

16. Liquid cooled and fluid pressure operated frictional mechanism as set forth in claim 14, wherein the pumping elements of each of said fluid pressure operated pumping means are differential pistons having one area acting on the liquid in the corresponding endless circulating system and another area responsive to the pressure of fluid supplied from said fluid pressure source.

17. Liquid cooled and fluid pressure operated frictional mechanism as set forth in claim 14, wherein each of said fluid pressure operated pumping means includes adjacent small and large cylinders, one of said cylinders being connected to the adjacent endless circulating system and the other having a connection with said fluid pressure source, a pair of connected small and large pistons slidably mounted in said cylinders, and a port in said one cylinder connected with said liquid reservoir, the port being normally open and being so positioned as to be closed on initial movement of said one piston in response to the application of fluid pressure to said fluid pressure operated pumping means.

18. Liquid cooled and fluid pressure operated frictional mechanism including a fluid pressure actuator having a movable frictional element, inlet and outlet ports in the actuator for respectively supplying cooling liquid to the actuator to cool said element and discharging cooling liquid from the actuator, means responsive to the pressure of liquid in the actuator for moving said element, a liquid circulating pump having connections with said inlet and outlet ports, said actuator, pump, and connections forming an edless liquid circulating system, and means for pressurizing the liquid in said endless circulating system including a pump having a pair of cylinders of different diameters, a pair of inter-connected pistons slidably mounted in said cylinders, a connection between one of said cylinders and said endless circulating system, and means for connecting the other of said cylinders to a separate source of fluid under pressure.

19. Liquid cooled and fluid pressure operated frictional mechanism as set forth in claim 18, wherein a cooling liquid reservoir is provided adjacent said endless circulating system, and a normally open port is provided in the wall of said one cylinder connected with said endless circuating system, said port being connected with said liquid reservoir and being so positioned as to be closed by the piston in said one cylinder during initial movement of the latter in response to the application of fluid pressure to the other of said pistons.

20. Liquid cooled and fluid pressure operated brake mechanism for a pair of interconnected vehicles each having a brake actuator of the type comprising a movable friction element, inlet and outlet ports in the actuator for respectively supplying cooling liquid to the actuator to cool said element and discharging cooling liquid from the actuator, and means responsive to the pressure of liquid in the actuator for moving said element to apply the brake, a closed liquid circulating system associated with each of said actuators including a liquid circulating pump having connections with said actuator inlet and outlet ports, a separate electric motor for driving each pump, fluid pressure operated pumping means connected with each of said closed systems for pumping additional liquid into the system to increase the pressure of liquid therein and move said friction element, a source of fluid pressure on one of said vehicles, a fluid pressure control valve connected with said source on said one vehicle, a connection between said control valve and the fluid pressure operated means on said one vehicle, means for connecting said control valve with the fluid pressure operating means on the other of said vehicles including a flexible fluid pressure connection between said vehicles, and means including a switch operable in response to the application of pressure to said fluid pressure operated pumping units by the operation of said control valve for energizing said motors.

21. Brake control mechanism for a pair of interconnected vehicles as set forth in claim 20, wherein each vehicle is provided with a cooling liquid reservoir having a normally open connection with the corresponding closed circulating system, said fluid pressure operated pumping means on each vehicle being operable on the application of fluid pressure thereto to close the corresponding normally open connection.

22. Brake control mechanism as set forth in claim 20, wherein each vehicle is provided with a heat exchanger connected in series in the closed liquid circulating system of the vehicle and a cooling liquid reservoir having a normally open connection with said system, said fluid pressure operated pumping means on each vehicle being operable on the application of fluid pressure thereto to close the corresponding normally open connection.

23. Liquid cooled and fluid pressure operated frictional mechanism including an endless liquid circuit having a liquid pressure operated actuator connected in series therein having inlet and outlet ports, a movable friction member having a friction surface on one side and a surface on the other side thereof directly exposed to liquid in said circuit and means associated therewith responsive to the pressure of the liquid in the actuator for moving said member, a circulator having suction and discharge ports having connections respectively with the outlet and inlet ports of the actuator, and operable to positively circulate liquid through said connections and actuator to engage and cool said friction member, and means for pumping additional liquid into said circuit to increase the pressure therein and actuate said pressure responsive means to move said friction member, said pumping means being connected to said circuit adjacent the suction port of said circulator, said pumping means having an atmospheric port connecting the endless circuit to atmosphere, operation of the pumping means to pump additional liquid into the endless circuit serving to close said port.

24. Liquid cooled and fluid pressure operated frictional mechanism as set forth in claim 23, wherein a heat exchanger is connected in series in the circuit in the connection between the circulator suction port and the actuator outlet port.

25. Liquid cooled and fluid pressure operated frictional mechanism including an endless liquid circuit having a liquid pressure operated actuator connected in series therein having a movable friction member and means associated therewith responsive to the pressure of the liquid in the actuator for moving said member, said member having a friction surface on one side and a surface on the other side thereof directly exposed to liquid in said actuator, a power operated circulator connected in series in said circuit for forcibly circulating liquid in said endless liquid circuit to cool said friction member, separate pressurizing means connected with said circuit and operable to pressurize the liquid in said circuit, and means controlled by the operation of said pressurizing means to increase the pressure of liquid in said circuit for rendering said circulator operable to circulate liquid in said closed circuit.

26. Liquid cooled and fluid pressure operated brake mechanism including a fluid pressure actuator having a movable pressure responsive member, a friction element having an operative connection with said member, said friction element having a friction surface on one side and a chamber for cooling liquid on the opposite side having inlet and outlet ports, a cooling liquid circulating pump having a suction port having a connection with the outlet port of the chamber and a discharge port having a connection with the inlet port of the chamber, said pump, connections and chamber forming an endless circuit for cooling liquid, means for driving said pump, and means for pressurizing the liquid in said circuit and for correspondingly controlling the pressure in said actuator including a source of fluid under pressure, connecting means between said source and circuit and between said source and actuator operable on application of fluid under pressure to said connecting means from said source to increase the pressure in said circuit and in said actuator, an operator controlled element having a release position and movable to applied positions, and means associated with said connecting means and controlled by said operator controlled element for controlling and maintaining the pressures in said circuit and actuator in accordance with the degree of movement of said operator controlled element from said release position.

27. Liquid cooled and fluid pressure operated brake mechanism including a brake actuator having a cylinder, a piston slidably mounted in the cylinder and forming a chamber therebetween, a channel for cooling liquid in the outer end of the piston, a metal friction element secured to the outer end of the piston and forming a wall for said channel, inlet and outlet ports in said channel for supplying cooling liquid thereto and discharging cooling liquid therefrom, and a connection between said channel and chamber, a liquid circulating pump including a suction port having a connection with the outlet port of said piston channel and a discharge port having a connection with the inlet port of said channel, said pump, connections and channel forming an endless circuit for circulating liquid, means for pressurizing the liquid in said circuit to move said piston including a source of fluid under pressure, connecting means between said source and circuit operable on application of fluid under pressure to said connecting means from said source to increase the pressure of liquid in said circuit, and a self-lapping control valve associated with said connecting means including a movable control element having a release position and operable on movement from release position to control the pressure of fluid applied to said connecting means and circuit at a value proportional to the degree of movement of the control element from release position, and means operable on movement of said control element from release position for rendering said circulating pump operable to pump cooling liquid through said circuit and operable on return of said element to release position for stopping the operation of said circulating pump.

28. Liquid cooled and fluid pressure operated brake mechanism including a brake actuator having a cylinder, a piston slidably mounted in the cylinder and forming a chamber therebetween, a channel for cooling liquid in the outer end of the piston, a metal friction element secured to the outer end of the piston and forming a wall for said channel, inlet and outlet ports in said channel for supplying cooling liquid thereto and discharging cooling liquid therefrom, and a connection between said channel and chamber, a liquid circulating pump having a suction port including a connection with the outlet port of said channel and a discharge port having a connection with the inlet port of said channel, said pump, connections and channel forming an endless circuit for circulating liquid, drive means for the pump, a liquid reservoir having a connection with said circuit, a source of fluid under pressure, a self-lapping control valve having an exhaust port, an inlet port connected with said source, and an outlet port connected with said liquid reservoir, a control element for operating said self-lapping valve having a release position and movable therefrom to applied positions, said valve being operable on movement of the control element to applied positions to supply fluid under pressure from said source to said reservoir to pressurize the latter and to maintain the pressure therein in accordance with the degree of movement of said control element from release position and being operable on movement of the control element to release position to release the pressure from said reservoir, and means operable on initial movement of said control element from release position toward applied position for rendering said pump operative to circulate liquid in said circuit and operable on movement of the control element to release position to render the pump inoperative.

References Cited in the file of this patent

UNITED STATES PATENTS

| | | |
|---|---|---|
| 1,723,032 | Harrington | Aug. 6, 1929 |
| 2,127,557 | Ells | Aug. 23, 1938 |
| 2,150,617 | Weihe | Mar. 14, 1939 |
| 2,226,457 | Whittingham | Dec. 24, 1940 |
| 2,281,138 | Christensen | Apr. 28, 1942 |
| 2,378,100 | Pogue | June 12, 1945 |
| 2,395,811 | Griffith | Mar. 5, 1946 |
| 2,406,304 | Levy | Aug. 20, 1946 |
| 2,471,858 | Bloomfield | May 31, 1949 |
| 2,732,685 | Oishei | Jan. 31, 1956 |
| 2,742,982 | Helmbold | Apr. 24, 1956 |

FOREIGN PATENTS

| | | |
|---|---|---|
| 783,756 | France | Apr. 15, 1935 |
| 896,915 | Germany | Nov. 16, 1953 |
| 701,725 | Great Britain | Dec. 20, 1953 |
| 739,244 | Great Britain | Oct. 26, 1955 |